(12) United States Patent
Fiebelkorn

(10) Patent No.: US 9,623,894 B2
(45) Date of Patent: *Apr. 18, 2017

(54) CHILD SEAT CARRIAGE

(71) Applicant: David M. Fiebelkorn, Decatur, GA (US)

(72) Inventor: David M. Fiebelkorn, Decatur, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/984,237

(22) Filed: Dec. 30, 2015

(65) Prior Publication Data
US 2016/0107673 A1  Apr. 21, 2016

Related U.S. Application Data

(62) Division of application No. 14/473,543, filed on Aug. 29, 2014, now Pat. No. 9,254,857.

(60) Provisional application No. 61/872,214, filed on Aug. 30, 2013.

(51) Int. Cl.
| | |
|---|---|
| *B62B 1/00* | (2006.01) |
| *B62B 9/12* | (2006.01) |
| *B62B 5/00* | (2006.01) |
| *B62B 5/08* | (2006.01) |
| *A45C 5/14* | (2006.01) |
| *A45C 9/00* | (2006.01) |
| *B62B 7/00* | (2006.01) |
| *A45C 13/30* | (2006.01) |

(52) U.S. Cl.
CPC .................. *B62B 9/12* (2013.01); *A45C 5/14* (2013.01); *A45C 9/00* (2013.01); *B62B 5/0093* (2013.01); *B62B 5/082* (2013.01); *B62B 7/006* (2013.01); *A45C 2013/306* (2013.01)

(58) Field of Classification Search
CPC ......... B62B 3/007; B62B 3/02; B62B 5/0093; A45C 5/14; A45C 9/00; A45C 13/00; A45C 13/30
See application file for complete search history.

(56) References Cited

U.S. PATENT DOCUMENTS

| | | | | |
|---|---|---|---|---|
| 5,957,482 A | * | 9/1999 | Shorter .................. | B62B 3/007 280/47.35 |
| 6,296,259 B1 | * | 10/2001 | Anderson ............ | B60N 2/2806 280/30 |
| 6,845,991 B1 | * | 1/2005 | Ritucci ................... | B62B 3/007 280/30 |
| 7,658,389 B2 | * | 2/2010 | Ostrow ................ | B60N 2/2848 280/47.25 |

(Continued)

*Primary Examiner* — Hau Phan
(74) *Attorney, Agent, or Firm* — Culhane Meadows PLLC; J. Scott Anderson

(57) ABSTRACT

Systems and methods for transporting an object on a carriage in tandem with a wheeled case are presented. A carriage in one embodiment includes a generally planar platform supported by one or more rolling members, a fence strap for holding the seat against a fence that extends upwardly from the platform, and an anchor strap connecting the seat to the wheeled case. The carriage may be used to transport any object or seat, such as a child safety seat. In another embodiment, the platform includes a leading section connected to a trailing section. The trailing section may include an opening that is sized shaped to receive at least a portion of the rolling members therethrough when the two sections are folded together.

13 Claims, 9 Drawing Sheets

(56) References Cited

U.S. PATENT DOCUMENTS

| | | | | |
|---|---|---|---|---|
| 7,918,502 | B2 * | 4/2011 | Bacon | A45C 13/30 297/188.2 |
| 8,286,767 | B2 * | 10/2012 | Malinowski | A45C 5/14 190/115 |
| 8,944,459 | B1 * | 2/2015 | Hagy | B62B 3/02 280/47.34 |
| 2004/0021353 | A1 * | 2/2004 | Lozano | A45C 13/00 297/255 |
| 2004/0066069 | A1 * | 4/2004 | Caldana | A45C 5/14 297/250.1 |
| 2005/0110231 | A1 * | 5/2005 | Brown | A45C 5/14 280/47.26 |
| 2008/0042379 | A1 * | 2/2008 | Amran | A45F 4/02 280/30 |
| 2010/0059970 | A1 * | 3/2010 | Scott | A45C 9/00 280/658 |
| 2012/0085609 | A1 * | 4/2012 | Ostrow | A45C 5/14 190/18 A |

* cited by examiner

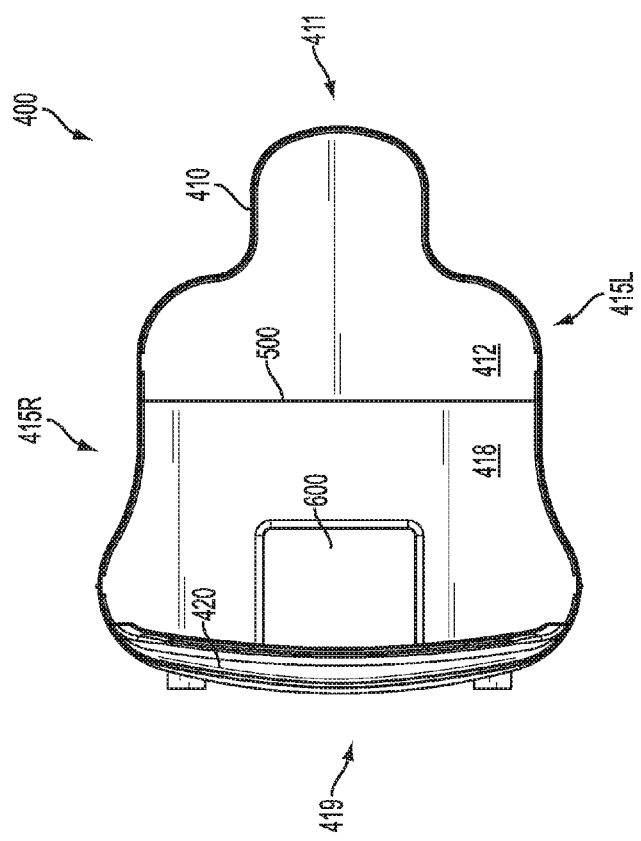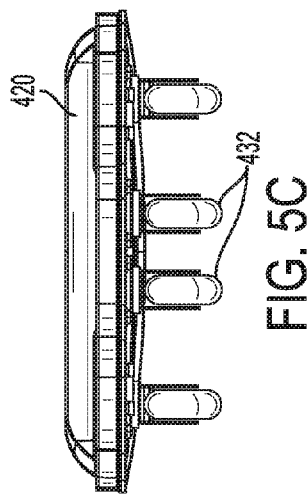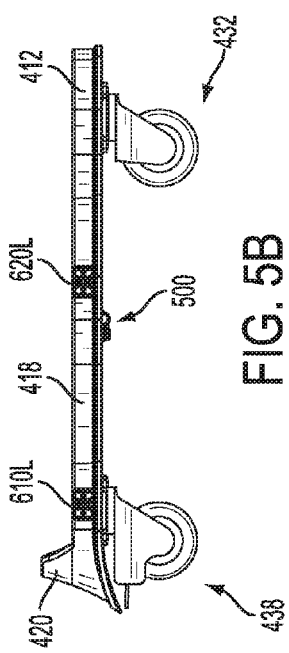

CHILD SEAT CARRIAGE

CROSS-REFERENCE TO RELATED APPLICATIONS

This application is a divisional of U.S. application Ser. No. 14/473,543, entitled "Child Seat Carriage," filed Aug. 29, 2014, now issued U.S. Pat. No. 9,254,857, which claims the benefit of U.S. Provisional Application 61/872,214, entitled "Child Safety Seat Carriage For Use With Wheeled Luggage," filed Aug. 30, 2013. Each application identified above is incorporated herein by reference in its entirety in order to provide continuity of disclosure.

BACKGROUND

Certain disclosed embodiments relate to portable carriage and, more particularly, to a carriage for supporting and attaching a child safety seat to a wheeled case such as a rolling suitcase.

Parents traveling by airplane with small children face a dilemma: bring the heavy car seat from home and carry it through the airport, or rent a car seat at the destination. Car rental agencies typically charge a high fee, per car seat, per day. Also, a rented car seat may be in poor condition or unsafe.

Existing systems for transporting a car seat are bulky, inefficient, and lack sufficient support for carrying a child. Strap assemblies for attaching a car seat to wheeled luggage can add too much weight, overloading the wheels and causing failure. Foldable or detachable seats, mounted to wheeled luggage, may support a child but are not designed to carry the car seat.

Thus, there is a need in the art for improved carriage assemblies that are simple to attach to wheeled luggage and strong enough to safely support a seat and provide enhanced control.

SUMMARY

A carriage for transporting a seat on a platform in tandem with a wheeled case is described. In one embodiment, the carriage includes (1) a generally planar platform having a leading edge and a trailing edge, the platform sized and shaped to receive a seat; (2) one or more rolling members supporting the platform above a surface; (3) a fence extending upwardly from the platform near the trailing edge, the fence sized and shaped to frictionally engage with at least a portion of the seat; (4) a fence strap passing across the seat and attached to the platform such that the fence strap in combination with the fence substantially secures the seat horizontally against the fence; and (5) an anchor strap connecting the seat to a wheeled case.

In another embodiment, a foldable carriage includes (1) a selectively foldable platform comprising a leading section connected to a trailing section by one or more hinge assemblies, the platform sized and shaped to receive a seat; (2) one or more rolling members supporting the platform above a surface; (3) a fence extending upwardly from the trailing section, the fence sized and shaped to frictionally engage with at least a portion of the seat; (4) a fence strap passing across the seat and attached to the trailing section such that the fence strap in combination with the fence substantially secures the seat horizontally against the fence; and (5) an anchor strap connecting the seat to a wheeled case.

Other apparatuses, methods, systems, features, and advantages of the disclosed embodiments will be apparent to one of ordinary skill in the art upon review of the following figures and detailed description. All such additional apparatuses, methods, systems, features, and advantages are intended to be included within this description and to be included within the scope of the accompanying claims.

BRIEF DESCRIPTION OF THE DRAWING

Features of the various embodiments disclosed will become more apparent in the detailed description, in which reference is made to the appended drawing, wherein:

FIGS. 5-A, 5-B, and 5-C is a series of orthogonal views of a carriage, according to various embodiments. FIG. 5-A is a plan view. FIG. 5-B is the corresponding side view. FIG. 5-C is the corresponding end view.

Corresponding reference numbers indicate corresponding parts or elements throughout the several views of the drawing.

DETAILED DESCRIPTION

Figure 1:
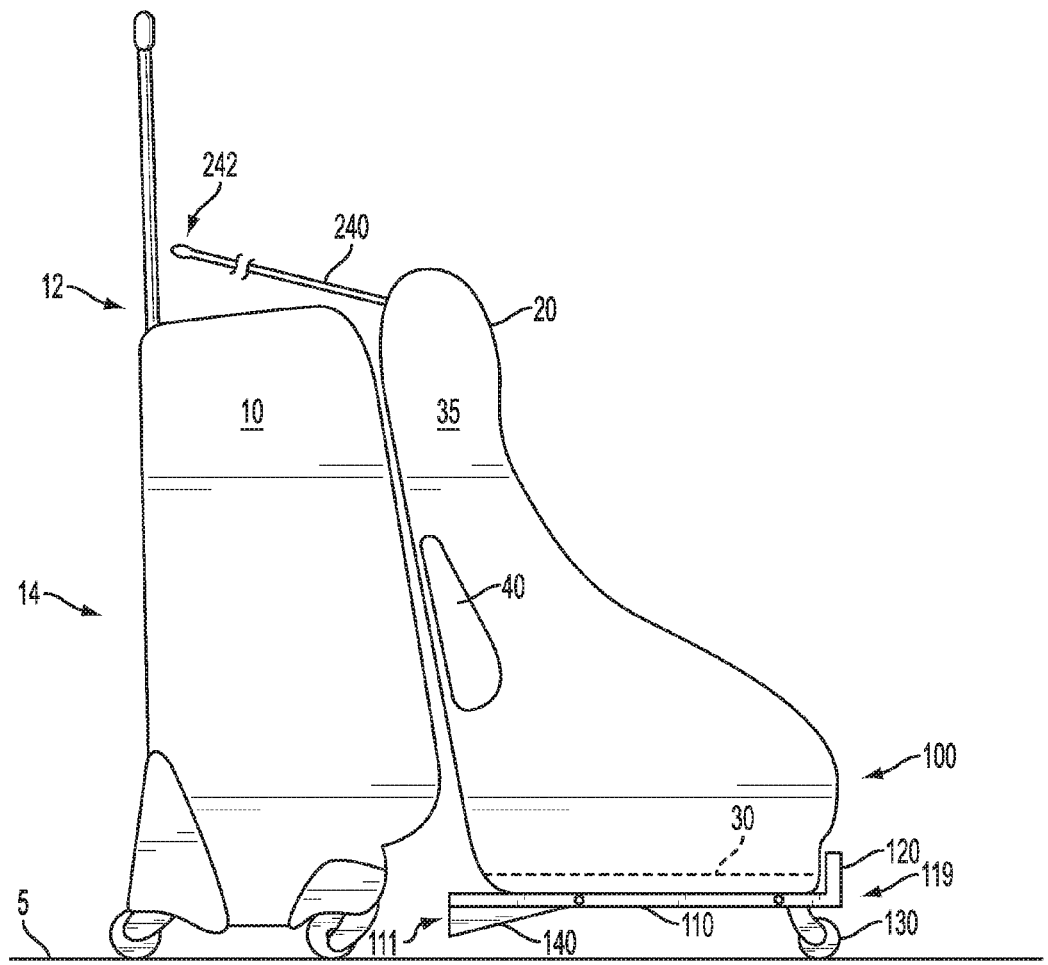
FIG. 1 is a side-view illustration of a wheeled case and a carriage (straps not shown), according to various embodiments.

The present systems and apparatuses and methods are understood more readily by reference to the following detailed description, examples, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

Like parts are marked throughout the following description and drawings with the same reference numerals. The drawings may not be to scale and certain features may be shown exaggerated in scale or in somewhat schematic format in the interest of clarity, conciseness, and to convey information.

The following description of the invention is provided as an enabling teaching of the invention in its best, currently known embodiment. To this end, those skilled in the relevant art will recognize and appreciate that many changes can be made to the various aspects of the invention described herein, while still obtaining the beneficial results of the present invention. It will also be apparent that some of the desired benefits of the present invention can be obtained by selecting some of the features of the present invention without utilizing other features. Accordingly, those who work in the art will recognize that many modifications and adaptations to the present invention are possible and can even be desirable in certain circumstances and are a part of the present invention. Thus, the following description is provided as illustrative of the principles of the present invention and not in limitation thereof.

As used throughout, the singular forms "a," "an" and "the" include plural referents unless the context clearly dictates otherwise. Thus, for example, reference to a component can include two or more such components unless the context indicates otherwise.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

As used herein, the terms "optional" or "optionally" mean that the subsequently described event or circumstance may or may not occur, and that the description includes instances where said event or circumstance occurs and instances where it does not.

Although the systems and methods described herein are discussed in the context of a carriage for a child safety seat for use with a wheeled case, the technology disclosed herein is also useful and applicable in a variety of other contexts including those where an improved portable carriage is desired.

Carriage

A carriage for transporting a seat in tandem with a wheeled case, such as an upright four-wheeled rolling suitcase, according to particular embodiments, includes a generally planar platform supported by rolling members, a fence strap for holding the seat against a fence that extends upwardly from the platform, and an anchor strap connecting the seat to the wheeled case. The phrase 'in tandem' refers to the arrangement of the carriage and the wheeled case, one in front of the other, and does not suggest a precise alignment. The carriage may be used to transport any object or seat, such as a child safety seat used in automobiles. The seat may be transported on the carriage empty, holding a seated child, or holding other items.

The platform may be generally planar in shape, having a leading edge and a trailing edge, and generally opposing side edges. The platform may be constructed of reinforced plastic or some other suitable material that is strong enough to support the expected weight of an object to be carried, an empty seat, or a seat carrying an infant, toddler, or small child, while also being sufficiently lightweight for easy transport and lifting. The platform may be sized and shaped to support any of a variety of different types and brands of car seats. The platform may also include a non-skid top surface for added stability and improved traction between the base of the seat and the upper surface of the platform. Also, the platform may be sized and shaped such that, while still attached to a seat, the platform and seat together will fit through a standard scanning machine at most airport security checkpoints.

The one or more rolling members that are supporting the platform may be selected to support the expected weight of an object to be carried, an empty seat, or a seat carrying an infant, toddler, or small child. In particular embodiments, as illustrated, the rolling members may be a pair of wheels. The rolling members may be ordinary wheels, spherical rollers, fixed-direction casters, swivel casters, braked casters, lockable casters, or any other support that provides support and facilitates easy motion of the platform along a surface.

The fence, according to particular embodiments, extends upwardly from the upper surface of the platform. The fence acts as a barrier and it may be sized and shaped to frictionally engage with at least a portion of an object or seat, such as the lower portion or of a seat. The fence may be positioned at or near the rear or trailing edge of the platform. The fence may be generally planar, rectilinear or curved, and it may take other shapes that are more suitable for engaging with the seat or frame of one or more particular seat designs. The fence may be generally vertical or it may be oriented at other angles more suitable for engaging with and/or retaining an object or seat on the platform. The fence may be sized and shaped to accommodate and receive any type of child car seat. In this aspect, the fence is sized tall enough to provide a secure and stable surface for the seat or its base, while also being short enough to minimize interference with other elements of the seat. All or part of the fence may be selectively retractable. For example, the fence may be hingedly mounted to the platform so that the fence may be folded against the platform when not in use.

The fence strap, according to particular embodiments, passes across the seat and is attached to the platform such that the fence strap, when in place and reasonably tight, exerts a rearward force against the seat and substantially secures the seat horizontally against the fence. Of course, the fence strap also exerts a downward force on the seat, holding it vertically against the platform. The fence strap may pass through a passage that extends through the frame of the seat, if present.

The anchor strap, according to particular embodiments, connects the seat to the wheeled case. The anchor strap may be provided with and attached to the car seat. For some types of car seats, the anchor strap is adjustable in length and has a hook or clasp on its free end (distal end) for attaching the strap to an anchor post, such as the anchor post provided on the lower back side of many automobile seats.

First Embodiment

In a first embodiment, as illustrated in FIG. 1, a child safety seat 20 may include a frame 35 and a base 30. The frame may include a passage 40 extending through the frame 35 and/or across the back of the seat 20. The seat may be provided with an anchor strap 240 that is attached to an upper portion of the seat 20 and has a free or distal end 242 which includes a hook, clasp, or other assembly for attaching the anchor strap 240 to a post or anchor.

As illustrated in FIG. 1, a carriage 100 may include a platform 110 that is sized and shaped to receive the base 30 of a child safety seat 20. The base 30, as shown, may rest against a generally upright or fence 120 that is mounted to or otherwise made an integral part of the platform 110. The fence 120 may be located near the trailing edge 119 of the platform 110. The platform 110 may be generally planar or curved in shape, and sized to support any of a variety of types and brands of seats, such as child safety seats. In FIG. 1, the carriage 100 is shown supporting a car seat 20 next to a wheeled case 10.

The platform 110 may be supported above a surface 5 by one or more rolling members 130 and/or by one or more support members 140. As illustrated in FIG. 1, the platform 110 is supported by one or more rolling members 130 near the trailing edge 119, and by one or more support members 140 near the leading edge 111.

The one or more support members 140 that are supporting the platform 110, near the front or leading edge 111, may be selected to support the expected weight of an object to be carried, an empty seat, or a seat carrying an infant, toddler, or small child. In particular embodiments, the support members 140 may be pins, pegs, posts, blocks, bars, beams, blades, sled runners, wheels, or any other supporting element. The lowest end or foot of a support member 140 may be shaped, rounded, treated, capped, or otherwise prepared to facilitate sliding across a surface. The attachment of one or more straps, as described herein, facilitates adequate support for the platform 110, in combination with support from the wheeled case 10, so that the platform 110 in this first embodiment may be adequately supported by two rolling members and two support members, for example, instead of requiring four rolling members for support.

When connected to a wheeled case 10, the leading edge 111 may be positioned such that the one or more support members 140 do not touch the surface 5, as shown. In this embodiment, the platform 110 may be adequately supported by the or more rolling members 130 near the trailing edge 119, acting at least partially alone without additional rolling support from the support members 140 near the leading edge 111. In another aspect, the support members 140 may be shorter in length than the rolling members 130, so that the support members 140 do not inhibit the motion of the entire carriage 100 when in use. For example, the support members 140 may be short enough to avoid inadvertently touching or otherwise engaging the surface during transport. The support members 140 may be sized in length so that the platform 110, when disconnected from the wheeled case 10, will remain sufficiently level for the seat, its contents or occupant, to remain secure and/or seated and comfortable. In particular embodiments, the support member 140 may be selectively retractable and/or frictionally retractable such that when a sufficient force is exerted, the support members 140 will retract and thereby not inhibit transport.

Figure 2:
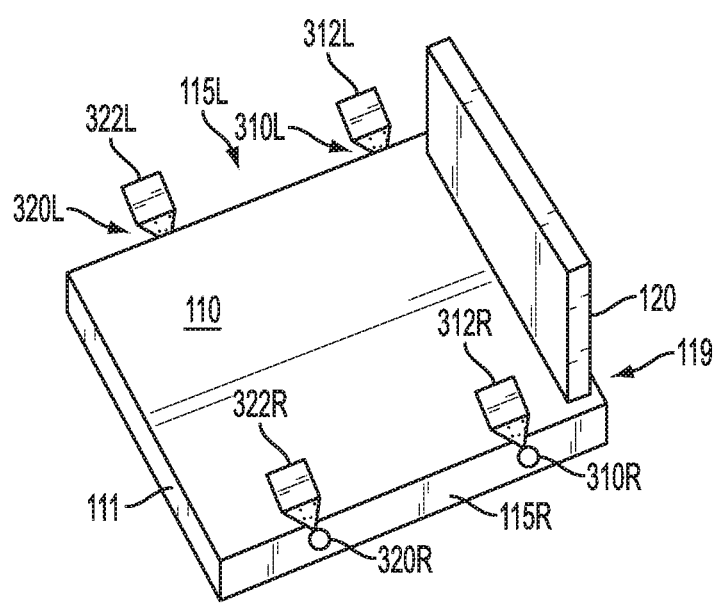
FIG. 2 is a schematic illustration of a platform, according to various embodiments.
Figure 3:
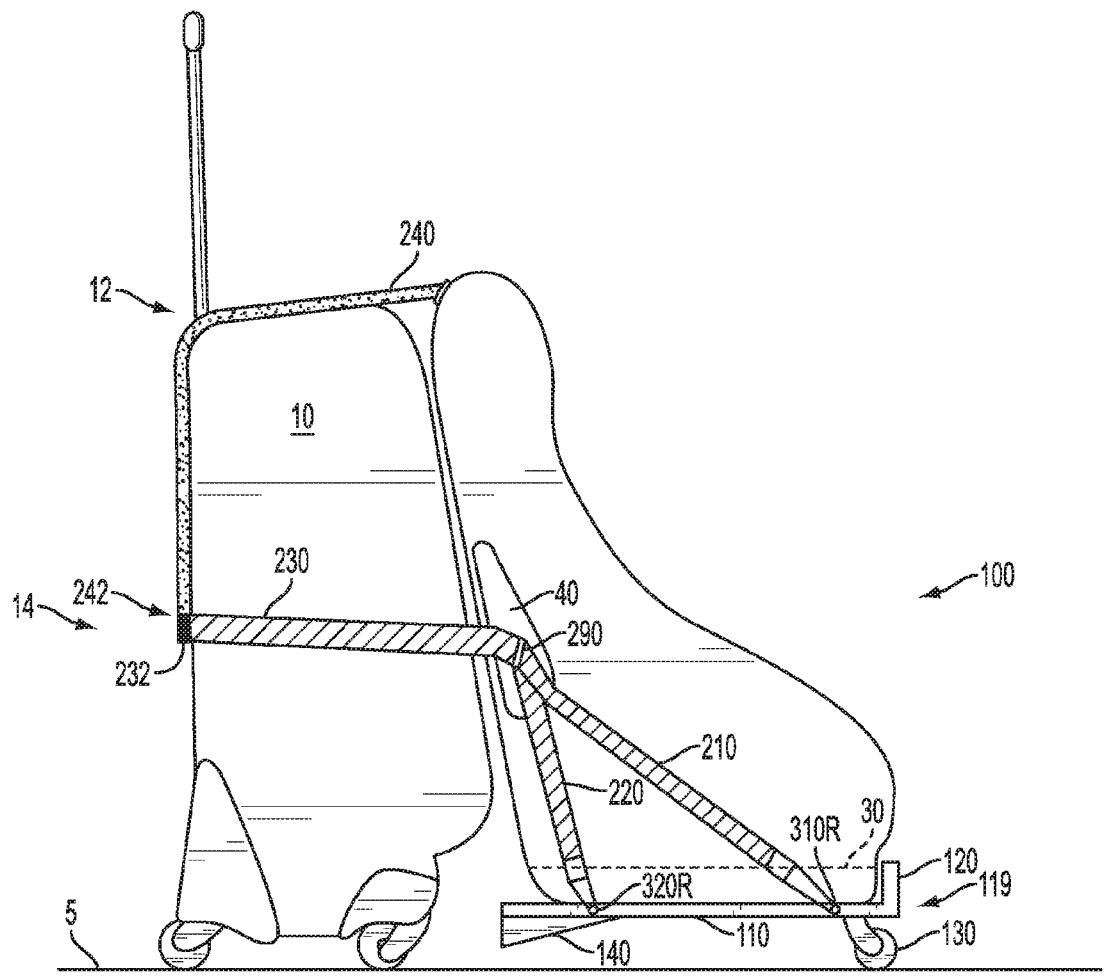
FIG. 3 is a side-view illustration of a carriage supporting a seat, attached by a set of straps to a wheeled case, according to various embodiments.

FIG. 2 is a schematic illustration of a platform 110, in a first embodiment, that includes a pair of anchor points 310R, 310L positioned on generally opposing side edges 115R, 115L of the platform 110 near the trailing edge 119. The anchor points 310R, 310L may be positioned and configured to receive the fence strap 210 (not shown). The fence strap 210, as shown in FIG. 3, may extend from the right anchor point 310R, across the seat 20 or through a passage 40 in the seat 20, and attach to the left anchor point 310L. Referring again to FIG. 2, the right anchor point 310R may support a connector 312R such as a buckle. The assembly, as shown, may include a short length of strap between the anchor point 310R and the connector or buckle 312R.

According to particular embodiments, the attachments or buckles described herein may be a side-release snap-fit buckle, in which the male element has a central guide plate and two spring arms, each supporting a retaining block near the end. The female element of the buckle has a frame with side holes for capturing the retaining blocks, thereby temporarily and selectively securing the two elements together. The paired male-female elements may be coordinated in order to support the ready attachment of one or more straps to one or more connectors (located at anchor points, described herein). For example, when a female element is used as a connector, it will receive a male element attached to the end of a strap. Conversely, a male element on a connector will receive a female element on the end of a strap.

As illustrated in FIG. 2, the carriage 100 in a first embodiment may also include a pair of secondary anchor points 320R, 320L positioned on generally opposing side edges 115R, 115L of the platform 110. The secondary points 320R, 320L may be positioned and configured to receive a secondary strap 220 (not shown). The secondary strap 220, as shown in FIG. 3, may pass across the seat 20 and help secure the seat 20 to the platform 110. As shown in FIG. 3, the secondary strap 220 may extend from the right secondary anchor point 320R, across the seat 20 or through a passage 40 in the seat 20, and attach to the left secondary anchor point 320L. The secondary anchor points 320R, 320L may also support connectors 322R, 322L respectively, as shown in FIG. 2.

FIG. 3 is a side-view illustration of a carriage 100 supporting a seat 20 that is attached by straps to a wheeled case 10, according to the first embodiment. Shown are a fence strap 210, a secondary strap 220, a third strap 230, and an anchor strap 240.

As shown, a third strap 230 (not attached to the platform 110) may pass around the seat 20 and/or through a passage 40 in the seat 20, and also pass around the wheeled case 10 in a generally circumferential manner, near the middle portion 14 of the case 10, where the third strap 230 may be attached or clasped to itself.

In another aspect, the third strap 230 may include a retainer 232 such as a buckle or a loop for receiving a hook, clasp, or other fastener that is positioned on the distal end 242 of the anchor strap 240.

Figure 4:
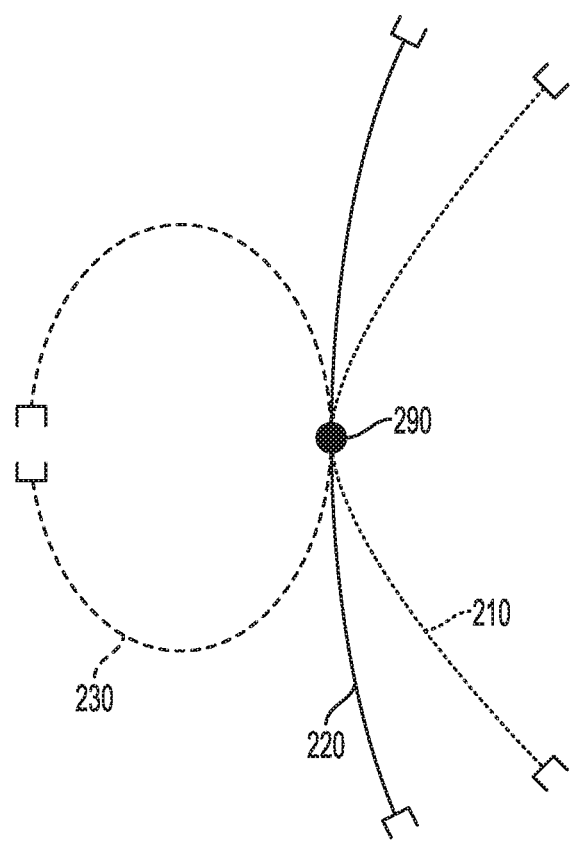
FIG. 4 is a schematic illustration of a set of straps, joined together by a fastener, according to various embodiments.

FIG. 4 is a schematic illustration of a set of straps 210, 220, 230, joined together by a fastener 290, according to various embodiments. In use, the fastener 290 may be located inside the passage 40, as illustrated in FIG. 3. In an alternative embodiment, the fastener 290 may be used to keep only two of the straps together. The fastener 290 may permanently join two or more straps together, or the fastener 290 may be selectively releasable so that one or more straps may be removed from the set.

In use, the fastener 290 may facilitate easy manipulation and coordination of the straps during assembly and disassembly, while keeping the straps together for storage. The fastener 290 may also help the user orient the straps in or near the passage 40 through the seat 20 during assembly. The fastener 290 may be used to keep the set together, during use and for easy storage. For example, at security checkpoints, the third strap 230 may be disengaged in order to quickly separate the seat 20 from the case 10; however, the first and second straps 210, 220 may remain engaged so that the platform 110 remains connected to the seat 20. In a related aspect, the platform 110 may be sized and shaped so that the platform and seat together will fit through a standard scanning machine at most airport security checkpoints.

Although some of the embodiments described herein contain three straps, other configurations are contemplated including the use of more straps, fewer straps, and one or more straps having multiple legs or sections that extend to various connection points.

In general, each strap must be able to maintain a desired tension during use, to secure the seat 20 to the platform 110, and the seat 20 to the case 10, and for overall safety. The straps may be constructed of generally rigid, reinforced webbing, with adjustable buckles, clips, and locks. For example, the quick-release clips described herein may be used. The straps may be generally flexible and sized in length to attach any size seat 20 and shaped to maintain tension after long use. In still other embodiments, the straps may include a combination of rigid sections, flexible sections, adjustable tensioners, and/or flexible bungee-type straps.

Second Embodiment

Figure 6:
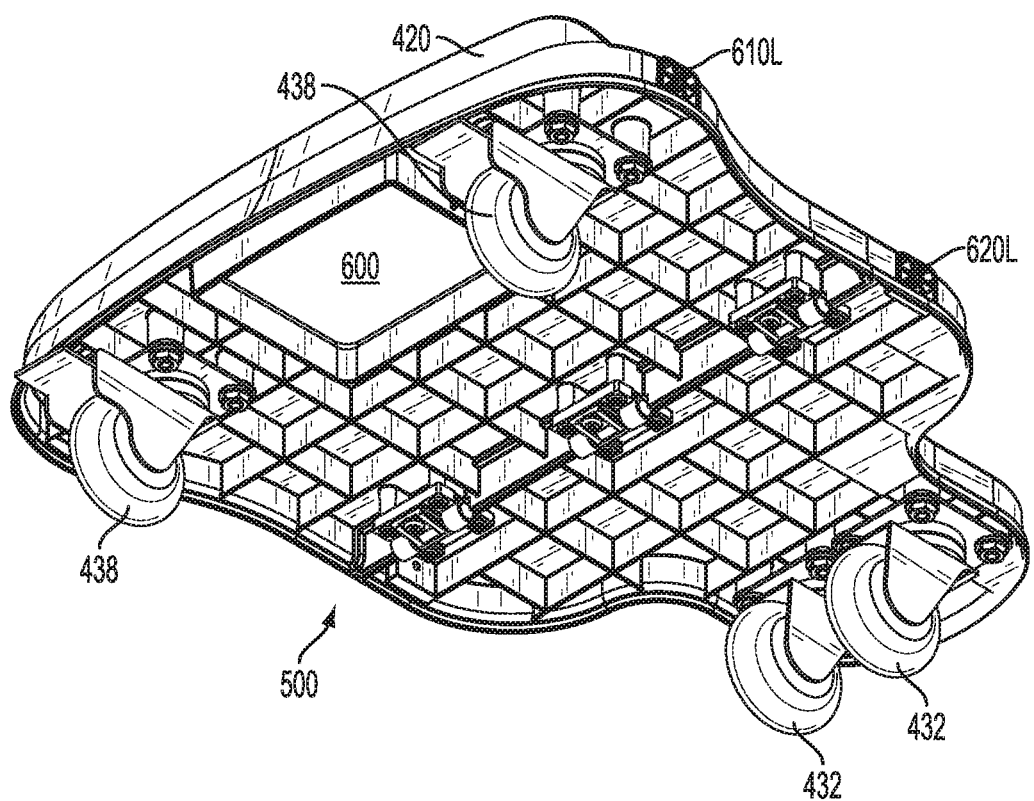
FIG. 6 is a perspective illustration of the bottom surface of a platform, according to various embodiments.

In a second embodiment, as illustrated in FIG. 5-A, a carriage 400 may include a platform 410 that is sized and shaped to receive and support an object such as a seat. The platform 410, in this second embodiment, comprises a leading section 412 connected to a trailing section 418. The connection 500 may be oriented along a generally transverse axis, as shown, and may include one or more hinge assemblies, positioned along the bottom surface of the platform 410 as shown in FIG. 6. When the platform 410 is unfolded and the two sections 412, 418 are positioned in a generally coplanar orientation, the connection 500 may be secured by one or more slideable tabs or locks (not shown) in order to inhibit unintended folding of the two sections 412, 418. Alternatively, the size, shape, and weight of the platform 410 may be constructed so that the two sections 412, 418 will remain in a generally coplanar orientation without requiring a tab or lock.

As shown in FIG. 5-A, the fence 420 may be curved and may be located near the trailing edge 419 of the trailing section 418 of the platform 410. The platform 410 may be generally planar in shape, and sized to support any of a variety of types and brands of seats such as child safety seats.

As illustrated in FIG. 5-B, the leading section 412 may be supported by one or more leading rolling members 432, such as a pair of fixed-direction casters, as shown, spaced relatively close together. The trailing section 418 may be supported by one or more trailing rolling members 438, such as a pair of lockable, swivel casters, as shown, spaced relatively far apart and near the trailing edge 419.

FIG. 5-C is an end view, illustrating the one or more leading rolling members 432, which are spaced relatively close together in this second embodiment.

Figure 7:
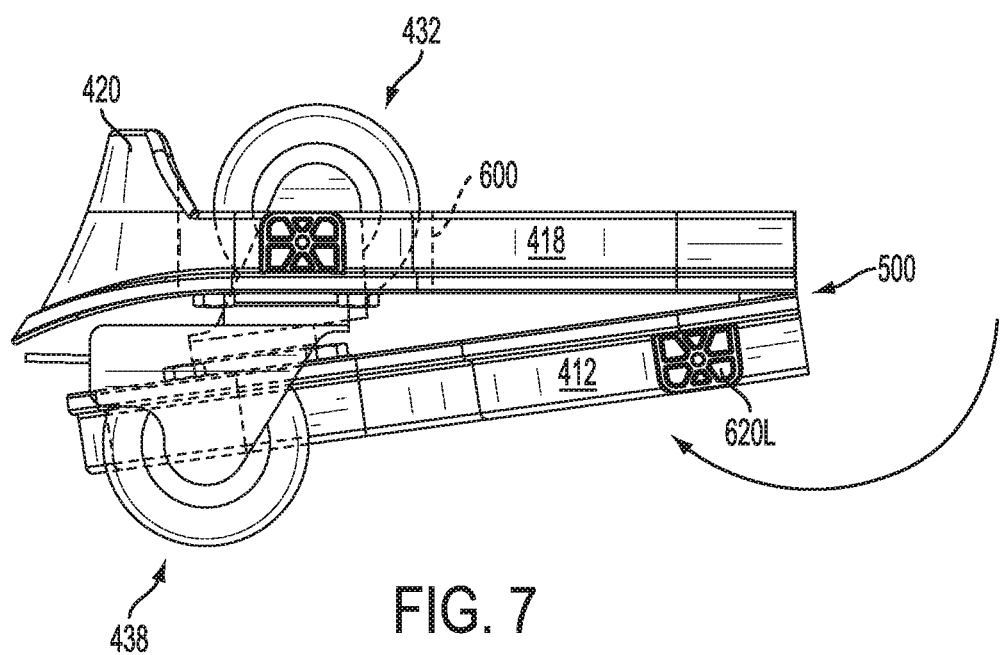
FIG. 7 is a perspective illustration of the bottom surface of a platform, according to various embodiments.

As shown in FIG. 5-A and FIG. 6, the trailing section 418 may include an opening 600 therethrough. The opening 600 may be sized and shaped to freely receive at least a portion of the one or more rolling members when the leading section 412 is folded toward the trailing section 418. Referring to FIG. 6, the leading rolling members 432 may be spaced relatively close together, and sized and shaped to fit into the opening 600 when the sections 412, 418 are folded together. As illustrated in FIG. 7, the leading rolling members 432 pass at least partially through the opening 600 in the trailing section 418 when the sections 412, 418 are folded together. In this aspect, as described herein, the opening 600 facilitates easy folding and more compact storage of the two-section platform 410.

Figure 8:
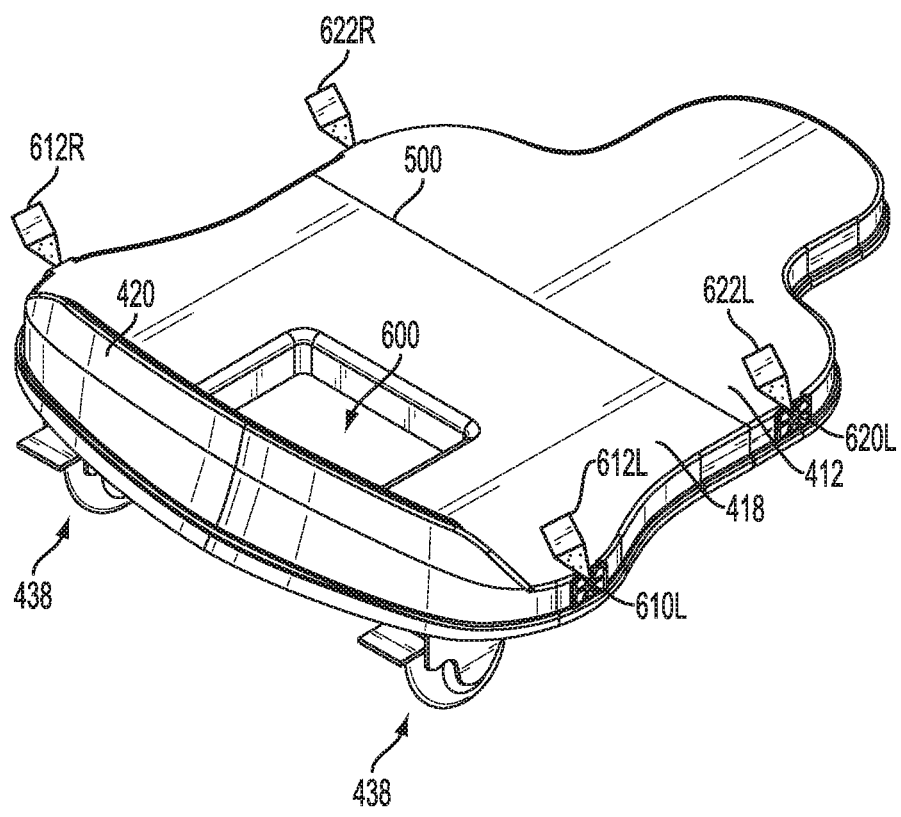
FIG. 8 is a perspective illustration of the top surface of a platform, according to various embodiments.
Figure 9:
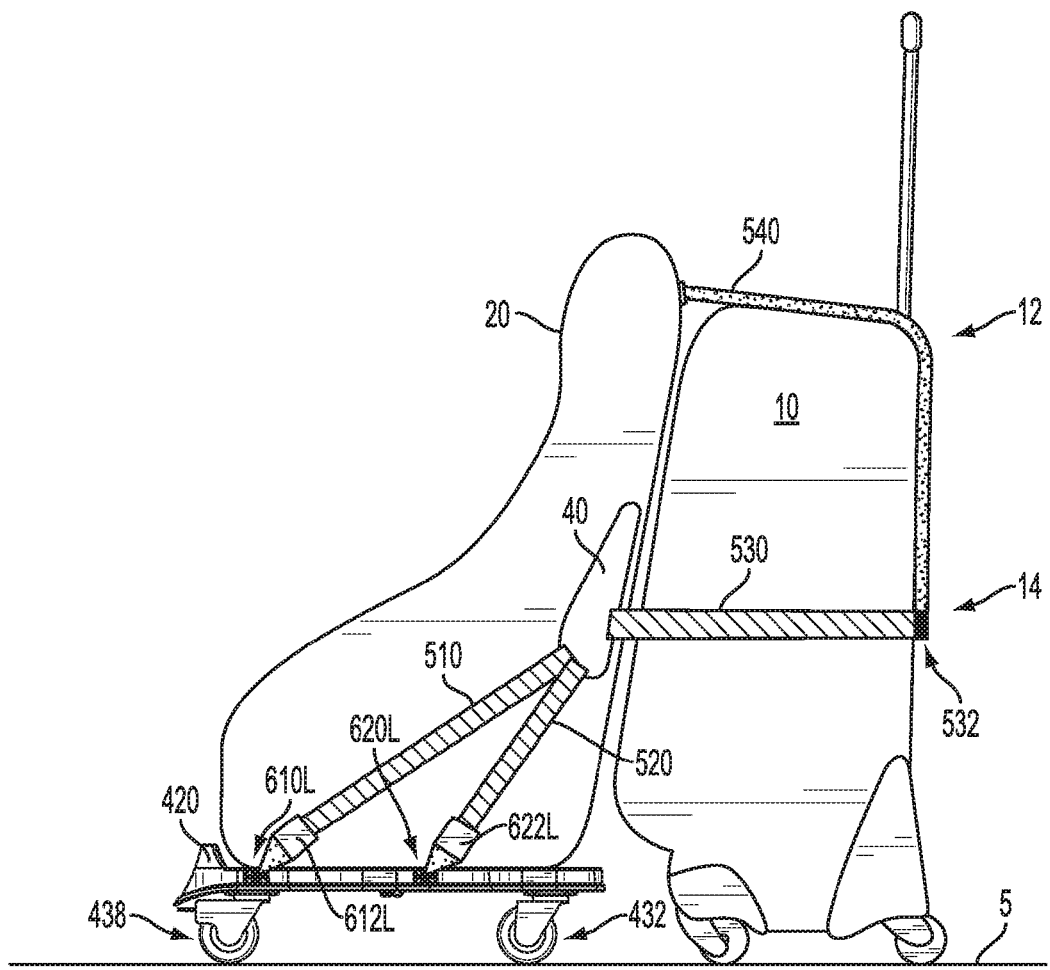
FIG. 9 is a side-view illustration of a carriage supporting a seat, attached by a set of straps to a wheeled case, according to various embodiments.

FIG. 8 is a perspective illustration of the top surface of a platform 410, in a second embodiment, that includes a pair of anchor points 610R, 610L positioned on generally opposing side edges 415R, 415L near the trailing edge 419. The anchor points 610R, 610L may be positioned and configured to receive the fence strap 510 (not shown). The fence strap 510, as shown in FIG. 9, may extend from the right anchor point 610R, across the seat 20 or through a passage 40 in the seat 20, and attach to the left anchor point 610L. Referring again to FIG. 8, the right anchor point 610R may support a connector 612R such as a buckle. The assembly, as shown, may include a short length of strap between the anchor point 610R and the connector or buckle 612R. As illustrated in FIG. 9, the carriage 400 in a second embodiment also includes a pair of secondary anchor points 620R, 620L positioned on generally opposing side edges 415R, 415L of the platform 410. The secondary anchor points 620R, 620L may be positioned and configured to receive a secondary strap 520 (not shown). The secondary strap 520, as shown in FIG. 9, may pass across the seat 20 and help secure the seat 20 to the platform 410. As shown in FIG. 9, the secondary strap 520 may extend from the right secondary anchor point 620R, across the seat 20 or through a passage 40 in the seat 20, and attach to the left secondary anchor point 620L. The secondary anchor points 620R, 620L may also support connectors 622R, 622L respectively, as shown in FIG. 8.

FIG. 9 is a side-view illustration of a carriage 400 supporting a seat 20 that is attached by straps to a wheeled case 10, according to the second embodiment. Shown are a fence strap 510, a secondary strap 520, a third strap 530, and an anchor strap 540.

As shown, a third strap 530 (not attached to the platform 410) may pass around the seat 20 and/or through a passage 40 in the seat 20, and also pass around the wheeled case 10 in a generally circumferential manner, near the middle portion 14 of the case 10, where the third strap 530 may be attached or clasped to itself.

In another aspect, the third strap 530 may include a retainer 532 such as a buckle or a loop for receiving a hook, clasp, or other fastener that is positioned on the distal end 542 of the anchor strap 540.

One of more of the straps 510, 520, 530 may be joined together by a fastener, or a selectively releasable fastener, according to various embodiments, for easy manipulation and coordination of the straps during assembly and disassembly, and for keeping the straps together for storage.

Methods of Use

In use, a child safety seat 20 may be removed from the user's passenger vehicle and otherwise readied for transport. The platform 110 may be placed on the ground or other surface. The base 30 of the car seat 20 may be placed against the fence 120 on the top surface of the platform. One or more of the straps 210, 220, 230 may be placed through the passage 40 in the car seat 20 such that the fastener 290, if present, is placed in a generally central location inside the passage 40. In this way, the ends of the straps may be generally accessible and oriented for easy use.

In a first embodiment, the fence strap 210 may be attached to the right anchor 310R on the right side of the platform 110 and to the left anchor point 310L located on the left side of the platform 110, and tightened to a desired tension such that the seat 20 is pulled rearward and the base 30 is against the fence 120.

The second strap 220 may be attached to the right secondary anchor point 320R and to the left secondary anchor point 320L, and tightened to a desired tension such that the seat 20 is pulled downward against the top surface of the platform 110.

The third strap 230 may be passed around the wheeled case 10 and attached to itself or otherwise tightened to a desired tension such that the seat 20 is pulled toward the wheeled case 10 and secured.

The car seat's anchor strap 240 may be passed across the top portion 12 of the wheeled case 10, through or around the handle, optionally, and down the back side of the case 10. The hook or clasp located on the free end or distal end 242 of the anchor strap 240 may be attached to a retainer 232 located on the third strap 230. The retainer 232 may be positioned near the center of the back side of the case 10 in order to facilitate a balanced and generally centered support for the seat using the anchor strap 240.

For security checkpoints, the anchor strap 240 and the third strap 230 may be unfastened, thereby releasing the platform 110 and car seat 20 from the wheeled case 10. The wheeled case 10 may be placed on the belt and scanned, by itself. The car seat 20 with the platform 110 still attached may also be placed on the belt and scanned. After scanning, the third strap 230 may be re-fastened around the case 10 and the anchor strap 240 may be attached to the retainer 232, and the carriage 100 is once again ready for transport.

At the airport gate, the car seat 20 with the platform 110 still attached may be gate-checked or brought onboard and stowed in an overhead bin during flight.

Similarly, in a second embodiment, the platform 410, if folded for storage, may be unfolded and placed on the ground or other surface.

In a first embodiment, the fence strap 510 may be attached to the right anchor 610R on the right side of the platform 410 and to the left anchor point 610L located on the left side of the platform 410, and tightened to a desired tension such that the seat 20 is pulled rearward and the base 30 is against the fence 420.

The second strap 520 may be attached to the right secondary anchor point 620R and to the left secondary anchor point 620L, and tightened to a desired tension such that the seat 20 is pulled downward against the top surface of the platform 410.

The third strap 530 may be passed around the wheeled case 10 and attached to itself or otherwise tightened to a desired tension such that the seat 20 is pulled toward the wheeled case 10 and secured.

The car seat's anchor strap 540 may be passed across the top portion 12 of the wheeled case 10, through or around the handle, optionally, and down the back side of the case 10. The hook or clasp located on the free end or distal end 542 of the anchor strap 540 may be attached to a retainer 532 located on the third strap 530. The retainer 532 may be positioned near the center of the back side of the case 10 in order to facilitate a balanced and generally centered support for the seat using the anchor strap 540.

CONCLUSION

Although several embodiments have been described herein, those of ordinary skill in art, with the benefit of the teachings of this disclosure, will understand and comprehend many other embodiments and modifications for this technology. The invention therefore is not limited to the specific embodiments disclosed or discussed herein, and that may other embodiments and modifications are intended to be included within the scope of the appended claims. Moreover, although specific terms are occasionally used herein, as well as in the claims that follow, such terms are used in a generic and descriptive sense only, and should not be construed as limiting the described invention or the claims that follow.

The invention claimed is:

1. A carriage for transporting a seat in tandem with a wheeled case, comprising:
    a generally planar platform having a leading edge and a trailing edge, said platform sized and shaped to receive a seat;
    one or more rolling members supporting said platform above a surface;
    a fence extending upwardly from said platform near said trailing edge, said fence sized and shaped to frictionally engage with at least a portion of said seat;
    a fence strap passing across said seat and attached to said platform such that said fence strap in combination with said fence substantially secures said seat horizontally against said fence; and
    an anchor strap connecting said seat to a wheeled case.

2. The carriage of claim 1, wherein said platform further comprises a pair of anchor points positioned on generally opposing side edges of said platform near said trailing edge for receiving said fence strap.

3. The carriage of claim 1, further comprising a secondary strap passing across said seat and attached to said platform to substantially secure said seat vertically against said platform.

4. The carriage of claim 3, wherein said platform further comprises a pair of secondary anchor points positioned on generally opposing side edges of said platform for receiving said secondary strap.

5. The carriage of claim 1, further comprising a third strap passing across said seat and around a middle portion of said wheeled case.

6. The carriage of claim 5, wherein said seat comprises a base and a frame defining at least one passage therethrough, and wherein said third strap passes through said at least one passage.

7. The carriage of claim 5, wherein said anchor strap extends across a top portion of said wheeled case and a distal end of said anchor strap attaches to said third strap, such that said anchor strap in combination with said third strap substantially secures said seat against said wheeled case.

8. The carriage of claim 7, wherein said third strap further comprises a retainer positioned and configured to receive said distal end of said anchor strap.

9. The carriage of claim 1, wherein said seat comprises a base and a frame defining at least one passage therethrough, wherein said fence strap passes through said at least one passage, and wherein said fence is shaped and sized in height to retain said base on said platform.

10. The carriage of claim 1, wherein said generally planar platform comprises a leading section connected to a trailing section by one or more hinge assemblies,
    wherein said one or more rolling members comprises one or more leading rolling members supporting said leading section and one or more trailing rolling members supporting said trailing section, and
    wherein said trailing section defines an opening therethrough that is sized and shaped to freely receive said one or more leading rolling members when said trailing section is rotated about said one or more hinge assemblies toward said leading section.

11. The carriage of claim 1, wherein said one or more rolling members comprise a rolling support selected from the group consisting of wheels, spherical rollers, swivel casters, fixed-direction casters, braked casters, and lockable casters.

12. The carriage of claim 1, wherein said one or more rolling members comprises a rigid support selected from the group consisting of pins, pegs, posts, blocks, bars, beams, blades, and runners.

13. The carriage of claim 1, further comprising a fastener joining together one or more of said fence strap, said secondary strap, and said third strap.

* * * * *